United States Patent [19]
Matarrese et al.

[11] Patent Number: 4,925,896
[45] Date of Patent: May 15, 1990

[54] PROCESS FOR THE CONTINUOUS PRODUCTION IN SOLUTION OF STYRENE THERMOPLASTIC RESINS

[75] Inventors: Savino Matarrese, Verona; Anna Grazia Rossi, Mantova; Mauro Lo Consolo, Porto Mantovano; Giuseppe Cigna, Mantova; Italo Borghi, Ferrara, all of Italy

[73] Assignee: Montedipe, S.p.A., Milan, Italy

[21] Appl. No.: 177,421

[22] Filed: Apr. 4, 1988

[30] Foreign Application Priority Data

Apr. 7, 1987 [IT] Italy .............................. 41004 A/87

[51] Int. Cl.$^5$ .................... C08F 255/06; C08F 279/04
[52] U.S. Cl. ........................................ 525/53; 525/54; 525/265; 525/316
[58] Field of Search ................ 525/53, 54, 316, 265

[56] References Cited

U.S. PATENT DOCUMENTS 3,658,946  4/1972  Bronstert et al. .................... 525/53
4,419,488  12/1983  Fukumoto et al. ................... 525/53

Primary Examiner—Wilbert J. Briggs, Sr.
Attorney, Agent, or Firm—Stevens, Davis, Miller & Mosher

[57] ABSTRACT

Process for the continuous production in solution of styrene thermoplastic resins by polymerization of a vinyl-aromatic monomer and of a vinyl-nitrile monomer in the presence of an elastomer and of a starter, wherein polymerization is conducted in two or more steps, wherein the elastomeric component is fed, in solution in the solvent and/or in the monomers, to the first step, polymerization is carried out in the subsequent steps at temperatures ranging from 70° to 150° C., in each step the reaction mass is gently and homogeneously stirred and the reaction product is caused to flow to a thin evaporator heated at 150°–300° C.

20 Claims, No Drawings

PROCESS FOR THE CONTINUOUS PRODUCTION IN SOLUTION OF STYRENE THERMOPLASTIC RESINS

DESCRIPTION OF THE INVENTION

This invention relates to a continuous mass-process for preparing styrene thermoplastic resins.

More particularly, the present invention relates to a continuous process-in-solution for preparing styrene thermoplastic resins based on acrylonitrile-styrene and a high- and low-unsaturation elastomer.

Well known in the technical literature are styrene thermoplastic resins comprising:

82-30% by weight of mixtures of styrene or a derivative thereof with acrylonitrile or in general an alkenyl-cyanide monomer, wherein the styrene content ranges from 5 to 95% by weight, and preferably from 40 to 75% by weight; and correspondingly 8-70% by weight of a low-unsaturation olefinic elastomer with an ethylene/propylene/non-conjugated diene rubber (generally known as EPDM), or of an unsaturated elastomer, such as polybutadiene.

As it is known, in such thermoplastic resins the elastomeric component is the carrier on which acrylonitrile and styrene are partially grafted and partially caused to mechanically adhere in the form of an acrylonitrile-styrene copolymer.

As it is also known, the thermoplastic resins above, in which the olefinic elastomer has a low unsaturation, are designated as AES resins, while those in which the olefinic elastomer is of the unsaturated type are generally referred to as ABS resins.

Furthermore, it is known that the AES resins exhibit the advantage, with respect to the ABS resins, of being more resistant to ageing, the physico-mechanical characteristics being the same.

Various processes for producing the above-cited styrene resins are known in the literature. At present, emulsion polymerization is generally adopted for producing the ABS resins; such technique, conversely, cannot be utilized for producing the AES resins owing to the difficulty to obtain the EPDM elastomer in the form of a latex as well as the high production cost.

Italian Patent No. 792,269 describes a process for the polymerization in an aqueous suspension of AES, wherein the elastomer, in the form of granules having sizes of 0.1-2mm, is suspended in water containing small amounts of a suspending agent. While stirring the suspension, the monomers and a free radical starter are added. At the end of the reaction, discrete beads are obtained which consists of the initial granules becoming larger because of the copolymer, which results from the polymerization of the monomer mixture and which in part mechanically adheres to the granule surface and in part is chemically bound. This process, although satisfactory as to the yields, leads to particles having a very poor surface appearance.

It is also known how to produce AES by a process which comprises suspending in water the mixture of monomers (styrene +acrylonitrile) and rubber (EPDM) dissolved in a solvent and conducting the polymerization in the presence of a peroxy starter until a conversion of 85% is obtained. Subsequently, the solvent and the unreacted monomers are distilled off and the AES resin is separated in the form of beads from the water.

However, this process is also not free from the above-cited drawbacks.

British Patent No. 2,059,427 describes the continuous polymerization in solution for producing AES resins. According to the teaching of this patent, AES resins endowed with excellent properties as to impact strength, hardness, transparency, brightness, etc. can be obtained only if the continuous solution polymerization is conducted in two or more than two reactors, provided the polymerization conversion in the first reactor is much higher than in the one corresponding to the phase inversion.

According to the process described in this British patent, AES resins are produced by means of continuous graft solution polymerization of a mixture of monomers comprising a vinyl-aromatic compound and a vinyl cyanide, in the presence of an ethylene/propylene/non-conjugated diene rubber and of an aromatic hydrocarbon as a solvent, wherein:

(a) the polymerization is carried out in two or more than two reactors arranged in series;

(b) the rubber is fed to the first reactor in the form of a homogeneous solution in all or in part of the monomers and/or in the solvent;

(c) optionally, all or part of the remaining monomers and/or solvent are fed to the first reactor;

(d) the rubber is dispersed into the first reactor and the monomers are polymerized, under stirring, until a polymerization conversion of 40-80% by weight of the monomers is obtained; and (e) the remaining monomers are polymerized under stirring, in the subsequent reactors until a complete polymerization is obtained.

According to a preferred embodiment of the above-cited process, the reactors are three or four, of the "CSTR" type (continuous stirred tank reactor), arranged in series, each of them being equipped with a stirring device, preferably an impeller capable of exerting a sufficiently intense stirring and mixing action on all the mass as to obtain sufficiently small and uniform rubber particles (0.3-0.7 micrometer).

A free radical polymerization starter, such as for example an organic peroxide, may be utilized.

The main drawbacks of this process are, first of all, the difficulty in controlling the elimination of the heat of reaction, the remarkable fouling, particularly at the reactor top, and the difficulty in maintaining good control of the particle sizes and, at any rate, a wide distribution of the grafted chains and of their molecular weights due to the wide distribution of the residence times.

It has now been found, in accordance with the present invention, that impact-resistant thermoplastic styrene resins having a high resistance to atmospheric agents, and a high resilience and surface brightness, are obtainable by continuous solution polymerization of a mixture of monomers comprising a vinyl-aromatic compound and a vinyl cyanide, in the presence of an elastomer and of a polymerization initiator, and in an inert solvent, wherein:

(a) the polymerization is conducted in one or more reaction stages arranged in series;

(b) in each stage the reaction mass is gently and homogeneously stirred in order to obtain a perfect heat exchange;

(c) the elastomeric component and the starter are homogenously dissolved into the monomers and into the solvent and the solution is fed to the first stage;

(d) the polymerization is carried on in the subsequent stages at a temperature ranging from 70° to 150° C. and at a pressure which is higher than the pressure at which occurs the evaporation of the fed monomeric components and of the fed solvent;

(e) the reaction mass is made to flow through a thin film evaporator, heated at a temperature ranging from 150° to 300° C. and equipped with rotating blades which exert on the polymer a sufficient shearing force to impart the desired morphological structure; and (f) the unreacted monomers and the solvent, after having been recovered from the evaporator, are fed to the first stage.

The essential feature of the process according to the present invention resides in that, unlike the previously known processes, the polymerization of the monomers is conducted under mild stirring conditions and nevertheless in such a manner as to permit an excellent thermal control of the reaction, regardless of the size and structure of the particles which, as it is known, must be fine enough as to give the final product the required characteristics of surface brightness.

The above said morphological structure is obtained, conversely, during the finishing step in the thin film evaporator, in which the unreacted monomers and the solvent are removed and, at the same time, the particle sizes are reduced to values lower than 1 micrometer, and preferably ranging from 0.1 to 0.4 micrometer, by means of a dynamic action which brings about a modification of the elastomeric phase structure.

It should be borne in mind that in the polymerization step, the phase inversion with separation of the rubber phase leads to very irregular structures ranging from cellular spherical particles with a diameter of a few micrometers up to very large particles of irregular shape. Such variation is largely dependent on the amount of solvent present in the reaction medium. Subsequently, in the thin film evaporator equipped with grinding blades, the morphological structure of the particles is rendered uniform and reduced to about 0.1–0.4 micrometer.

By using the process conditions given above it is possible to obtain, with high yields and process conditions easy to control, resins having excellent impact resistance properties, excellent resistance to chemicals and atmospheric agents, and high resilience and surface brightness.

Elastomers which are suitable for being utilized in the process of the present invention include both high-unsaturation elastomers and low-unsaturation elastomers. Among the low-unsaturation elastomers, there are mainly to be cited the EPM and EPDM rubbers, in which the ethylene/propylene weight ratio preferably ranges from 90:10 to 20:80. The content of non-conjugated diene preferably ranges from 4 to 50, expressed as iodine number. The non-conjugated diene may be a norbornene, such as e.g., alkylene-norbornene or alkylidene-norbornene; a cyclic diene such as e.g., dicyclopentadiene, cyclooctadiene-1,5; or an aliphatic diene such as pentadiene-1,4; dexadiene-1,4; hexadiene-1,5; etc.

Preferred EPDM rubbers are the following terpolymers: ethylene/propylene/5-methyl-tetrahydroindene, ethylene/propylene/6ethylidene-2-norbornene, ethylene/propylene/6-methylene-2-norbornene, ethylene/propylene/5-ethylidene-2-norbornene, etc.

The high-unsaturation elastomer utilized in the process of the present invention may be polybutadiene, polyisoprene, copolymers of butadiene and/or isoprene with styrene or with other monomers, polychloroprene, etc.

The amount of elastomer utilized is such that the rubber content in the final resin ranges from 5 to 50% by weight, and preferably from 10 to 35% by weight.

The elastomer is fed to the reaction mixture in the form of a homogeneous solution in a part of, or in the whole amount of, monomers and/or of solvent. In practice, it is preferred to preliminarily dissolve the elastomer in the whole amount of the solvent and of the utilized monomers.

The vinyl-aromatic compounds used as comonomers in the process of the present invention are those having the formula:

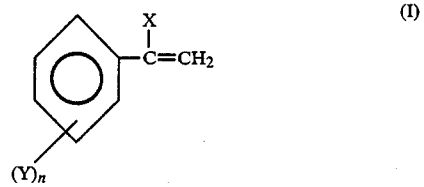

wherein
x is hydrogen or an alkyl radical having from 1 to 4 carbon atoms;
y is hydrogen, a halogen, or an alkyl radical having from 1 to 4 carbon atoms; and
n is 0 or an integer from 1 to 5.

Examples of vinyl aromatic monomers having the above-cited formula are: styrene; methyl-styrene; mono-, di-, tri-, tetra-, and penta-chloro-styrene and the corresponding alphamethyl styrenes; nucleus alkylated styrenes and the corresponding alpha-methyl styrenes such as ortho- and para-methyl-styrenes; ortho- and para-ethyl-styrenes; ortho- and para-methyl-alpha-methyl-styrenes; 3,5-dimethyl styrene, t-butyl styrene etc.

These monomers are utilizable either alone or in admixture with each other.

Vinyl cyanide, which is the other comonomer utilized in the process of the present invention, is a compound in which the vinyl group is bound to a nitrile group (—CN). Acrylonitrile is the preferred compound, although it is possible to use acrylic monomers, such as acrylic acid, methacrylic acid, alkyl esters of acrylic acid or of methacrylic acid, methacrylonitrile, acrylamide, etc. These comonomers may also be partially replaced by other vinyl monomers such as maleic anhydride, vinyl halides, vinyl ethers, etc. in an amount not exceeding 20% by weight referred to the total amount of monomers. A preferred monomer mixture consists of styrene and acrylonitrile in a weight ratio ranging from 90:10 to 60:40.

As mentioned above, the polymerization process of the present invention is conducted in the presence of an inert solvent, which is an aromatic hydrocarbon. Suitable aromatic hydrocarbons are: benzene, toluene, ethyl benzene, xylene, isopropyl benzene, etc. The preferred amount of solvent ranges from 50 to 300 and preferably from 60 to 150 parts by weight for 100 parts by weight of the sum of the elastomer + monomers.

The polymerization reaction, as in general all the graft-polymerization reactions conducted in solution, is effected in the presence of a polymerization free radical starter. Any known free radical initiator is utilizable, although the known organic peroxides generally used in graft-polymerization reactions are preferred. Suitable organic peroxides are: aromatic diacyl peroxides, such as di-benzoyl peroxide; peroxy-esters, such as t.butyl peroxy-isobutyrate, t.butyl-peroxy-laurate, t.butyl-peroxy-benzoate, etc., perketals such as 1,1-di-t.butyl-peroxy-3,3,5-trimethyl-cyclohexane, 2,2-di-t.butyl-peroxy-butane, etc.; peroxy-carbonates such as t.butyl-peroxy-isopropyl-carbonate; and peroxy-ketones such as 1,1-bis-t.butyl-peroxy-3,3,5-trimethyl-cyclohexanone. It is also possible to use mixtures of two or more than two of the above-cited peroxides. The amount of peroxide utilized is such that the polymerization conversion lies in the range of from 40 to 80% by weight in the first polymerization reactor; generally, amounts ranging from 0.1 to 2.0% by weight with respect to the total amount of monomers +elastomer are utilized.

A feature of the process of the present invention resides in carrying out a high degree of grafting of the resinous phase, consisting of the vinyl aromatic and vinyl nitrile monomers, on the elastomeric chain. Such grafting is carried out in particular in the first polymerization step, which must proceed isothermally, preferably at a temperature corresponding to the half-conversion period for the utilized peroxy starter, which is about 1 hour. In practice, temperatures from 70° to 150° C. are used.

Polymerization is conducted in reactors particularly suited for processing highly viscous solutions and for the control of highly exothermic reactions.

In practice, preferred are stirred tubular reactors of the "plug flow" type having a length/diameter ratio higher than 3 and being equipped with inner tubes and external jackets in which a thermoregulation fluid flows, in order to attain high coefficients of heat transfer. The reactor may be divided into two or more zones, each of these being heated to the same temperature or to different temperatures.

The "plug flow" reactors permit one to obtain polymerization conditions analogous to those of discontinuous processes, by which it is possible to obtain a uniform degree of grafting on all the elastomer chains and, in consequence, a high compatibility of the two phases with each other. At least two polymerization reactors are utilized and these are arranged in series. In this way, the time required to obtain a total conversion, for example of 90%, is remarkably reduced. It is generally preferred to have, in the first reactor, a polymerization conversion from 40 to 80% by weight, and preferably from 50 to 75% by weight, referred to the monomers. The reactors are maintained at 70°-150° C. and under a pressure which is higher than the pressure at which the evaporation of the fed components takes place, such as for example 0.5-5 bar.

Generally, no further addition of starter and/or of monomers is effected in the steps subsequent to the first step. It is preferred that the reaction mass leaving the last step be essentially free from the polymerization starter.

The thin-film evaporator utilized in the process of the present invention for realizing the finishing and obtaining the desired morphology of the particles, may be of any conventional type. Particularly preferred is a thin-film evaporator including a treatment chamber surrounded by a heating jacket, and a rotor arranged inside this chamber and coaxial with it, said rotor being equipped with extensions in the form of helical blades which are sloping by 10°-75° with respect to the rotor axis and by 5°-90° with respect to the axial plane passing through their connection line. Said blade-shaped extensions are arranged in at least two, preferably three, axial, equispaced and staggered rows and have the same pitch; each blade-shaped extensions of each row, viewed in axial direction, being staggered, with respect to the corresponding extensions of the adjacent rows, by a distance equal to the half pitch of the extensions. This evaporator is described in European patent application No. 87/309772.

The recovery of the resin, of the unreacted monomers and of the solvent is carried out according to the usual well known techniques. The unreacted monomers and the solvent are cooled, premixed and fed to the first step together with the new solution.

For a still better understanding of the present invention, a few examples are reported hereinafter, which are to be regarded as merely illustrative and not limitative of the invention.

EXAMPLE 1

A mixture consisting of:
- 25.5 parts by weight of styrene;
- 8 parts by weight of acrylonitrile;
- 11 parts by weight of EPDM rubber having an ethylene content of 61%, a propylene content of 30%, and an ethylidenenorbornene content of 9%;
- 55.5 parts by weight of toluene;
- 0.1 parts by weight of stabilizer Irganox 1076; and
- 0.20 parts by weight of the peroxy initiator 1,1-bis(-ter.butyl-peroxy)-3,3,5-trimethyl-cyclohexane (Trigonox 29B50);

was continuously fed, at a temperature of 80° C. and at a flow rate of 0.870 l/h, to two tubular reactors arranged in series. Each reactor was of the piston flow type having a total volume of 2.5 l and a length/diameter ratio equal to 5. Each tubular reactor was divided into three equal reaction sections, each section being thermoregulated in order to maintain the reaction mass therein according to the following temperature profile:
1st reactor: 105° C.; 105° C.; 105° C.
2nd reactor: 111° C.; 112° C.; 112° C.;

The pressure in each reactor was 2 bar.

Each reactor was equipped with stirrer consisting of 48 horizontal arms rotating at 50 rpm.

The mass discharged from the reactor had a solid matter content of 38% (conversion - 80%). It was fed to a thin-film devolatilization device having an inner surface of 0.04 m$^2$, equipped with a rotor with 4 rows of blade-shaped extensions sloping at an angle of 30° with respect to the rotor axis and at an angle of 5° with respect to the axial plane passing through their connection line.

The rotor was operated at 850 rpm. The devolatilizing device was thermoregulated by means of an outer jacket, where a diathermic oil at a temperature of 195° C. was made to flow. In such an apparatus, a vacuum with a residual pressure of 20 mm Hg was generated.

The discharged material having a residual volatile matter content of 0.11% was extruded in a single-screw extruder, type Bandera TR 45, and exhibited the characteristics indicated below in Table 1.

EXAMPLE 2

A mixture having the same composition as indicated in Example 1 was continuously fed, at a flow rate of 55 l/h, to two tubular, series-connected reactors, each of them having a volume of 100 l and a length/diameter ratio equal to 5. Each reactor was of the same type as specified in Example 1. Each reactor was subdivided into 3 sections and thermoregulated in such a way as to keep the reaction mass inside according to the following temperature profile:
1st reactor: 108° C.; 103° C.; 103° C.;
2nd reactor: 118° C.; 119° C.; 112° C.

Each reactor was equipped with a stirrer having 48 horizontal arms turning at 40 rpm.

The mass discharged from each reactor exhibited a solid matter content of 28% and 38% respectively.

The product discharged from the 2nd reactor was then fed to two thin film evaporators, arranged in series, having a surface of 0.5 m² each.

Each evaporator was equipped with a rotor having blade-shaped extension for viscous fluids, sloping by 25° with respect to the rotor axis and by 30° with respect to the axial plane passing through their connection line, said extensions being arranged in axial rows. Each evaporator was equipped with a thermoregulation jacket, in which diathermic oil was caused to circulate at a temperature of 220° C. in the first evaporator and at a temperature of 250° C. in the second evaporator.

The pressure in the first evaporator was 1.25 kg/cm², while the residual pressure in the second evaporator was 20 mm Hg.

The total volatile matter content in the polymer discharged from the 2nd stage was 0.05%.

The characteristics of the products are indicated below in Table 1.

TABLE 1

| Example No. | | 1 | 2 |
|---|---|---|---|
| Total EPDM % | | 29.0 | 30.0 |
| Acrylonitrile % | | 18.4 | 17.5 |
| Characteristics | ASTM Standard | Unit | |
| Melt Index (220/10) | D 1238 | gr/10' | 11.8 | 13.6 |
| Izod resilience ((notch) (23° C.) | D 256 | J/m | 600 | 720 |
| Vicat B (1 Kg.; 50° C./hr) | D 1525 | °C. | 107 | 107 |
| HDT (120° C./hr; 1.85 N/mm²) | D 648 | °C. | 88 | 89 |
| Resistance to the falling-Dart | (*) | J | 80 | 85 |
| Tensile modulus | D 638 | N/mm² | 1600 | 1500 |
| GLOSS (20°) | D 523 | % | 53 | 50 |

(*) The test consists in letting a weight of 4.560 g fall from different heights onto injection-molded small round plates of resin having a diameter of 100 mm and a thickness of 3.4 mm.

What is claimed is:

1. A process for producing thermoplastic styrene resins having particle sizes less than 1 micrometer, by the continuous solution polymerization of styrene monomer and a vinyl cyanide, in the presence of an elastomeric compound and of a polymerization initiator, and in an inert solvent, which process comprises:
   (a) dissolving the elastomeric compound and the polymerization initiator in the monomers and in the solvent;
   (b) feeding the solution to one or more reactors arranged in series, operating at a temperature ranging from 70° to 150° C., under a pressure higher than the pressure at which the evaporation of the fed monomers and the fed solvent takes place and under gentle stirring conditions to ensure the heat exchange without influencing or modifying the size and structure of the particles within each reactor;
   (c) feeding the reaction mass to a thin film evaporator which is heated at a temperature ranging from 150° to 300° C. and is equipped with rotary blades which exert on the polymer a cutting force sufficient to reduce the particle size to less than 1 micrometer; and
   (d) feeding to the first reactor the unreacted monomers and the solvent which are recovered from the evaporator.

2. The process according to claim 1, wherein the elastomer is a low-unsaturation elastomer.

3. The process according to claim 2, wherein the elastomer is an EPM rubber or an EPDM rubber having an ethylene: propylene weight ratio ranging from 90:10 to 20:80 and a non-conjugated diene content, if any, from 4 to 50, expressed as iodine number.

4. The process according to claim 1, wherein the elastomer is a high-unsaturation elastomer.

5. The process according to claim 1, wherein the elastomer amount ranges from 5 to 50% by weight with respect to the final resin.

6. The process according to claim 1, wherein the elastomer amount ranges from 10 to 35% by weight with respect to the final resin.

7. The process according to claim 1, wherein the vinyl cyanide is acrylonitrile with a styrene/acrylonitrile weight ratio ranging from 90:10 to 60;40.

8. The process according to claim 1, wherein the inert solvent is an aromatic hydrocarbon utilized in an amount ranging from 50 to 300 parts by weight per hundred parts by weight of elastomer and monomers.

9. The process according to claim 1, wherein the inert solvent is an aromatic hydrocarbon utilized in an amount ranging from 60 to 150 parts by weight per hundred parts by weight of elastomer and monomers.

10. The process according to claim 1, wherein the polymerization initiator is of the free radical type.

11. The process according to claim 10, wherein the polymerization initiator is an organic peroxide.

12. The process according to claim 10, wherein the amount of polymerization initiator ranges from 0.1 to 2% by weight with respect to the total amount of monomers and elastomer.

13. The process according to claim 1, wherein the first polymerization step is conducted isothermally at a temperature corresponding to the half-conversion time, of about 1 hour, of the initiator utilized.

14. The process according to claim 1, wherein polymerization is conducted in stirred plug flow tubular reactors having a length/diameter ratio higher than 3 and equipped with inner tubes and external jackets in which a thermoregulation fluid is made to circulate.

15. The process according to claim 14, in which the reactor is divided into two or more sections, each section being heated at different temperatures.

16. The process according to claim 14, wherein polymerization is conducted in at least two reactors arranged in series, wherein in the first reactor a conversion of 40–80% by weight is obtained.

17. The process according to claim 1, wherein the polymerization is conducted under a pressure ranging from 0.5 to 5 bar.

18. The process according to claim 1, wherein the thin film evaporator includes a treatment chamber, surrounded by a heating jacket, and a rotor arranged inside this chamber and coaxial with it, equipped with extensions in the form of helical blades which are sloping by 10°–75° with respect to the rotor axis and by 5°–90° with respect to the axial plane passing through their connection line; said blade-shaped extensions being arranged in at least two axial, equispaced and staggered rows having the same pitch, each blade-shaped extension of each row, viewed in the axial direction, being staggered, with respect to the corresponding extensions of the adjacent rows, by a distance equal to the half pitch of the extensions.

19. The process according to claim 1, wherein the particles coming from the polymerization have irregular sizes of a few micrometers as diameter, and, at the outlet of the thin film evaporator, dimensions ranging from 0.1 to 0.4 micrometer.

20. A process as defined in claim 1 wherein the final particle sizes are from 0.1 to 0.4 micrometers.

* * * * *